(12) United States Patent
Park

(10) Patent No.: US 12,369,053 B2
(45) Date of Patent: Jul. 22, 2025

(54) METHOD AND APPARATUS FOR MANAGING BASE STATION OF ELEMENT MANAGEMENT SYSTEM IN WIRELESS COMMUNICATION SYSTEM

(71) Applicant: Samsung Electronics Co., Ltd., Suwon-si (KR)

(72) Inventor: Youngjun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 17/943,505

(22) Filed: Sep. 13, 2022

(65) Prior Publication Data

US 2023/0007514 A1 Jan. 5, 2023

Related U.S. Application Data

(63) Continuation of application No. PCT/KR2021/002848, filed on Mar. 8, 2021.

(30) Foreign Application Priority Data

Mar. 13, 2020 (KR) .................. 10-2020-0031286

(51) Int. Cl.
*H04W 24/00* (2009.01)
*H04W 24/04* (2009.01)
*H04W 24/08* (2009.01)

(52) U.S. Cl.
CPC ........... *H04W 24/04* (2013.01); *H04W 24/08* (2013.01)

(58) Field of Classification Search
CPC .............................. H04W 24/04; H04W 24/08
(Continued)

(56) References Cited

U.S. PATENT DOCUMENTS 8,095,075 B2  1/2012  Vadlamudi
8,750,856 B2  6/2014  Kumar et al.
(Continued)

FOREIGN PATENT DOCUMENTS

CN  106470440  3/2017
EP  2341665  7/2011
(Continued)

OTHER PUBLICATIONS

Extended European Search Report and Written Opinion dated May 25, 2023 issued by the European Patent Office for European Patent Application No. 21768264.0.
(Continued)

*Primary Examiner* — Temica M Beamer
(74) *Attorney, Agent, or Firm* — Nixon & Vanderhye P.C.

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). According to a method of the disclosure, an element management system (EMS) may perform a report on an error of a base station based on base station performance statistics, and an administrator may effectively manage the base station according thereto. According to an embodiment of the disclosure, a method of EMS is provided. The method comprises: receiving, from a plurality of base stations, first base station performance statistics information including at least one of a number of times of radio resource control (RRC) connection establishment attempts and a number of times of RRC connection establishment successes; identifying second base station performance statistics information, based on the first base station performance statistics information; identifying at least one first base station among the plurality of base stations, based on the second base station
(Continued)

performance statistics information; identifying whether at least one second base station is detected from among the base stations other than the at least one first base station among the plurality of base stations, based on the second base station performance statistics information; and based on the at least one second base station being detected, transmitting an alarm message for the at least one second base station.

13 Claims, 14 Drawing Sheets

(58) Field of Classification Search
 USPC ........................................................ 455/423
 See application file for complete search history.

(56) References Cited

U.S. PATENT DOCUMENTS

| | | | |
|---|---|---|---|
| 9,179,348 B2 | 11/2015 | Östrup et al. | |
| 9,510,209 B2 | 11/2016 | Randall et al. | |
| 9,578,524 B2 | 2/2017 | Amirijoo et al. | |
| 9,585,041 B2 | 2/2017 | Huang et al. | |
| 9,838,920 B2 | 12/2017 | Wang et al. | |
| 10,009,784 B1* | 6/2018 | Evircan | H04L 41/142 |
| 10,103,821 B2 | 10/2018 | Westerberg et al. | |
| 2012/0327816 A1* | 12/2012 | Morrill | H04M 15/8016 |
| | | | 370/259 |
| 2014/0211638 A1 | 7/2014 | Huang | |
| 2018/0192359 A1* | 7/2018 | Wang | H04W 48/16 |
| 2018/0234900 A1* | 8/2018 | Sankaranarayan | H04W 76/30 |
| 2018/0376394 A1* | 12/2018 | Hahn | H04W 60/06 |
| 2019/0141785 A1* | 5/2019 | Chou | H04L 41/0816 |
| 2020/0022204 A1* | 1/2020 | Husted | H04W 52/50 |

FOREIGN PATENT DOCUMENTS

| | | |
|---|---|---|
| JP | 2009-071428 | 4/2009 |
| JP | 6249172 | 12/2017 |
| KR | 10-2006-0051451 | 5/2006 |
| KR | 10-2019-0005614 | 1/2019 |
| WO | 2009/031959 | 3/2009 |
| WO | 2017/028393 | 2/2017 |

OTHER PUBLICATIONS

International Search Report for PCT/KR2021/002848, dated Jun. 18, 2021, 6 pages.
Written Opinion of the ISA for PCT/KR2021/002848, dated Jun. 18, 2021, 4 pages.

* cited by examiner

METHOD AND APPARATUS FOR MANAGING BASE STATION OF ELEMENT MANAGEMENT SYSTEM IN WIRELESS COMMUNICATION SYSTEM

CROSS-REFERENCE TO RELATED APPLICATIONS

This application is a continuation of International Application No. PCT/KR2021/002848, designating the United States, filed on Mar. 8, 2021, in the Korean Intellectual Property Receiving Office and claiming priority to Korean Patent Application No. 10-2020-0031286, filed on Mar. 13, 2020, in the Korean Intellectual Property Office, the disclosures of which are incorporated by reference herein in their entireties.

BACKGROUND

Field

The disclosure relates to a self-organization network (SON) of a 5G NR system, and for example, to a fault management method and apparatus of management functions for operating a 5G base station system.

Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the meantime, as the number of base stations in a wireless communication system rapidly increases, a need for base station management technology has increased.

SUMMARY

Embodiments of the disclosure provide an element management system (hereinafter, referred to as EMS) that performs a report on fault of a base station based on base station performance statistics and an administrator can perform effective management of the base station based on the same.

According to an example embodiment of the present disclosure, there is provided a method of operating an element management system (EMS) in a communication system. The method comprises: receiving, from a plurality of base stations, first base station performance statistics information including at least one of a number of times of radio resource control (RRC) connection establishment attempts and a number of times of RRC connection establishment success; identifying second base station performance statistics information based on the first base station performance statistics information; identifying at least one first base station among the plurality of base stations, based on the second base station performance statistics information; identifying whether at least one second base station is detected from among the base stations other than at least one first base station among the plurality of base stations, based on the second base station performance statistics information; and transmitting an alarm message for the at least one second base station, based on the at least one second base station being detected.

Further, according to an example embodiment of the present disclosure, there is provided a server of a communication system. The server comprises: a transceiver and a controller, the controller configured to control the transceiver to receive, from a plurality of base stations, first base station performance statistics information including at least one of a number of times of radio resource control (RRC) connection establishment attempts and a number of times of RRC connection establishment success; identify second base station performance statistics information based on the first base station performance statistics information; identify at least one first base station among the plurality of base stations, based on the second base station performance statistics information; identify whether at least one second base station is detected from among the base stations other than at least one first base station among the plurality of base stations, based on the second base station performance statistics information; and transmit an alarm message for the at least one second base station, based on the at least one second base station being detected.

According to various embodiments of the present disclosure, a system administrator can continuously and periodically detect an abnormal operation related to a base station call connection, using the performance statistics information received from the base station, thereby enabling the administrator to perform efficient management of the base station.

The advantageous effects that can be obtained from the present disclosure are not limited to those described above, and any other effects not mentioned herein will be clearly understood by those having ordinary knowledge in the technical field to which the present disclosure belongs, from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
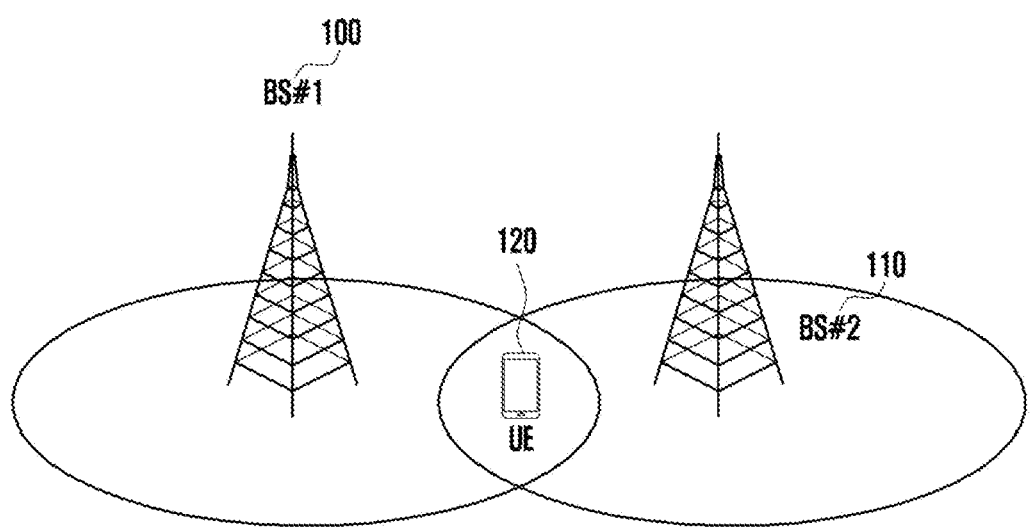
FIG. 1 is a diagram illustrating an example structure of a network for detecting an abnormal base station via a neighboring base station according to various embodiments.

Hereinafter, the present disclosure will be described in greater detail with reference to the accompanying drawings. In the following description of the present disclosure, when it is determined that a detailed description of its well-known function or configuration may unnecessarily obscure the subject matter of the present disclosure, the detailed description thereof may be omitted. Further, the terms described below, which are defined in consideration of functions in the present disclosure, may vary according to the intentions or practices of the users and operators. Therefore, the definition should be made based on the contents presented throughout this disclosure.

As used herein, a term for identifying an access node used in the following description, a term referring to a network entity, a term referring to messages, a term referring to an interface between network entities, a term referring to various identification information and the like are examples provided for convenience of description. Accordingly, the present disclosure is not limited to the terms described later, and other terms referring to objects having equivalent technical meanings may be used therefor.

Hereinafter, for convenience of description, the present disclosure uses some terms and names defined in the 3GPP LTE (3rd Generation Partnership Project Long Term Evolution) standard. However, the present disclosure is not limited to the terms and names, and may be equally applied to any systems conforming to other standards.

Advantages and features of the present disclosure, and methods of achieving them will become apparent referring to the various example embodiments described below in detail in conjunction with the accompanying drawings. However, the present disclosure is not limited to the embodiments disclosed below, and may be implemented in various different forms. Further, the embodiments are provided to make the present disclosure more complete, and to fully inform those having ordinary skill in the art to which the present disclosure belongs. Like reference numerals refer to like elements throughout the disclosure.

In this context, it will be understood that each of blocks of the flowchart diagrams and combinations of the flowchart blocks may be executed by computer program instructions. These computer program instructions may be installed in a processor of a general-purpose computer, a special-purpose computer, or other programmable data processing equipment, so that the instructions performed by the processor of the computer or other programmable data processing equipment generate a means for performing the functions described in the flowchart block(s). These computer program instructions may also be stored in a computer-usable or computer-readable memory that may cause the computer or other programmable data processing equipment to implement a function in a certain manner, and thus, the instructions stored in the computer-usable or computer-readable memory make it possible to produce an article of manufacture including instruction means for performing the function described in the flowchart block(s). Further, the computer program instructions may also be mounted on the computer or other programmable data processing equipment, and thus a series of operational steps may be performed on the computer or other programmable data processing equipment to create a computer-executed process, thereby making it possible for the instructions performed in the computer or other programable data processing equipment to provide steps for executing the functions described in the flowchart block(s).

Further, each block may indicate a module, a segment, or a portion of codes that includes one or more executable instructions for executing a specified logical function(s). Further, it should be also noted that in some alternative implementations, the functions referred to in the blocks may occur out of a designated order. For example, two blocks shown one after another may be performed substantially simultaneously, or it would also possible that the blocks are sometimes performed in the reverse order according to the corresponding function.

As used herein, the term '~unit (or module)' used in the embodiments may refer, for example, to software or a hardware component such as e.g., field programmable gate array (FPGA) or application specific integrated circuit (ASIC), to perform a certain function. However, such a unit does not limit the embodiments to software or hardware. Such a module may be configured to reside in an addressable storage medium or may be configured to execute one or more processors. Thus, as an example, such a unit includes components such as software components, object-oriented software components, class components and task components, and processes, functions, properties, procedures, subroutines, segments of program code, drivers, firmware, microcode, circuitry, data, databases, data structures, tables, arrays, and variables. The functions provided in the components and the units may be combined into a smaller number of components and units or separated into additional components and sub-units. In addition, the components and the units may be implemented to execute one or more CPUs in a device or secure multimedia card. Further, in an embodiment, such a unit may include one or more processors.

In the following description, in case where it is determined that a detailed description of any related known function or configuration may unnecessarily obscure the subject matter of the disclosure, the detailed description thereof may be omitted. Hereinafter, embodiments of the present disclosure will be described referring to the accompanying drawings.

As used herein, the term for identifying an access node, the term referring to a network entity, the term referring to messages, a term referring to an interface between network entities, the term referring to various identification information, and the like are examples provided for convenience of description. Accordingly, the present disclosure is not limited to the terms described below, and other terms referring to objects having equivalent technical meanings may be used.

For convenience of description, the present disclosure uses the terms and names defined in the LTE and NR standards corresponding to the state-of-the art standards defined by the 3rd Generation Partnership Project (3GPP) organization of the existing communication standards. However, the disclosure is not limited by the above terms and names, and may be equally applied to systems according to other technical standards. In particular, the present disclosure is applicable to 3GPP 5G NR (e.g., 5th generation mobile communication standard).

In addition, in the present disclosure, in order to determine whether a specific condition is satisfied or satisfied, an expression of 'greater than' or 'less than' may be used, but the expression is merely an exemplary description for expressing an example, not exclusion. Conditions described as 'more than' may be replaced with 'more than or equal to', conditions described as 'less than or equal to', and conditions described as 'more than and less than' may be replaced with 'more than or equal to' and 'less than or equal to'. In addition, hereinafter, 'A' to 'B' means at least one of the elements from A to (including A) B (including B).

Throughout the present disclosure, radio resource control statistics information may be referred to as the terms such as e.g., radio resource statistics information, signaling statistics information, base station performance statistics information, first base station performance statistics information or the like, or other terms having substantially the same and similar meanings thereto.

Further, throughout the present disclosure, sleeping cell statistics information may refer, for example, to statistics information used to determine a low traffic cell and a sleeping cell, implying second base station performance statistics information obtained (or generated) based on first base station performance statistics information received from a plurality of base stations, or may be referred to as other terms having substantially the same and similar meanings thereto.

In the meantime, throughout the disclosure, a sleeping cell determination process may include a low traffic cell determination and sleeping cell detection process.

Further, throughout the disclosure, a base station may refer, for example, to a physical node that provides wireless communication service to terminals, and a cell may refer, for example, to an uplink frequency and a downlink frequency operated by the base station. The base station may provide wireless communication service to the terminals using the cell. However, in the various example embodiments of the present disclosure to be described below, a cell and a base station may be used interchangeably.

In the present disclosure, the low traffic cell may refer to a cell in which an amount of connection and data transmission with a terminal is equal to or less than a reference value, even when the base station is in a normal operation. In the various example embodiments of the present disclosure to be described below, the low traffic cell may refer to a first base station group or a base station belonging to the first base station group.

Throughout the disclosure, the sleeping cell may refer to a cell for which an administrator is not able to recognize its fault/failure because a base station fails to notify the administrator of an abnormal state via an alarm means or the like, even though the base station is in an abnormal state that cannot accept new calls owing to various errors. In the various example embodiments of the present disclosure to be described below, the sleeping cell may refer to a second base station group.

Further, in the present disclosure below, an element management system (EMS) may refer to a system capable of monitoring and controlling a communication network equipment over a network. Meanwhile, for convenience of explanation, description will be made mainly with reference to statistics information on a base station equipment, as information that may be considered in operation of the EMS according to an embodiment of the present disclosure, but the scope of the present disclosure is not limited thereto.

FIG. 1 is a diagram illustrating an overall example configuration of a network for detecting an abnormal base station via a neighboring base station according to various embodiments.

According to an embodiment of the present disclosure, a first base station 100 may be a base station to be determined, when it is determined whether there is a fault in uplink signal reception. A second base station 110 may be a base station adjacent to the first base station 100 and may correspond to a base station connected to the first base station 100 via an X2 interface. A terminal 120 may correspond to a terminal that performs measurement on the first base station 100 and takes the second base station 110 as a serving base station.

Figure 2:
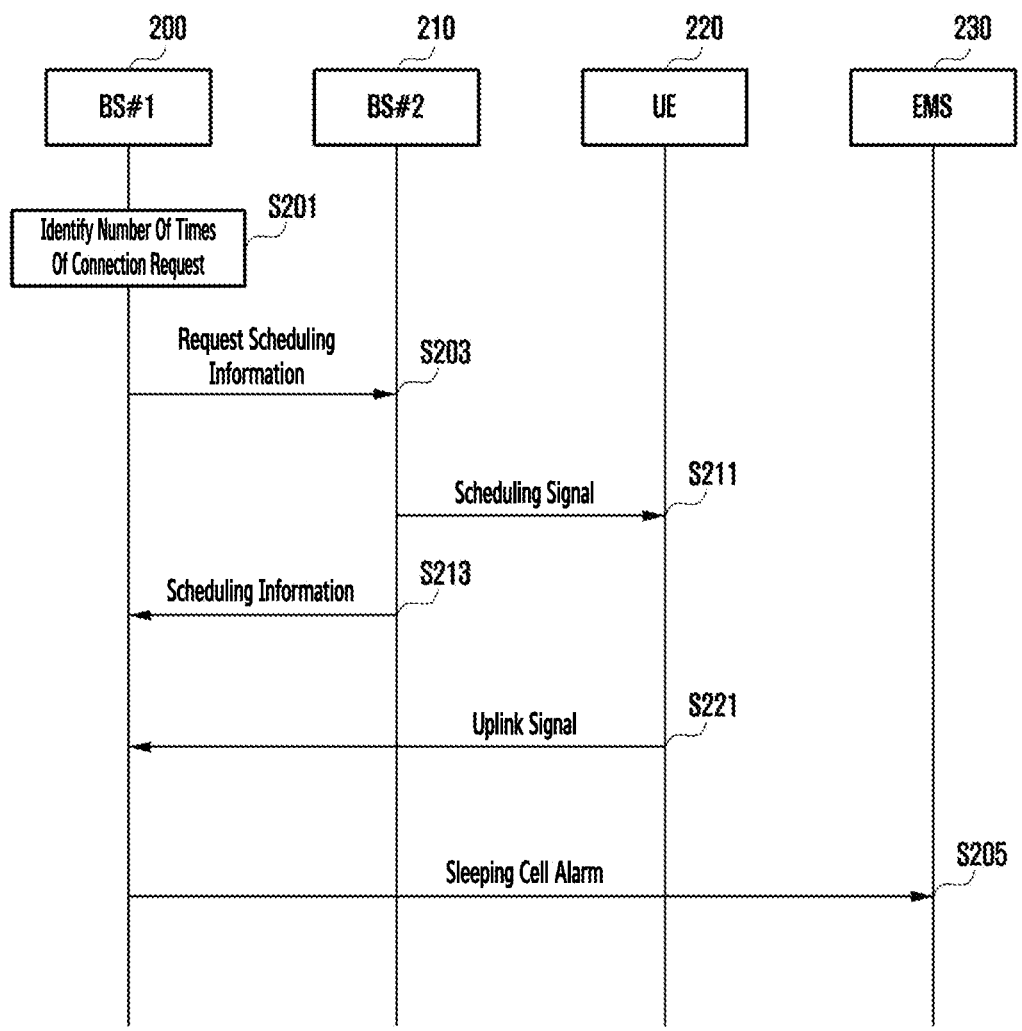
FIG. 2 is a signal flow diagram illustrating an example operation of a network for detecting an abnormal base station via a neighboring base station according to various embodiments.

FIG. 2 is a signal flow diagram illustrating an example operation of a network for detecting an abnormal base station via a neighboring base station according to various embodiments.

Referring to FIG. 2, in operation S201, the first base station 200 may determine the number of times of connection requests from the terminal 220 for a predetermined (e.g., specified) time. When the number of times of connection requests from the terminal 220 is equal to or less than a threshold value in operation S203, the first base station 200 may transmit a scheduling information request message to the second base station 210, which is its neighboring base station, to determine whether there is a problem in uplink signal reception of the base station. When the second base station 210 receives the scheduling information request message from the first base station 200, the second base station 210 may identify a terminal 220 performing measurement on the first base station 200 amongst the terminals 220 in RRC connection state, based on a measurement report periodically received from the terminal 220 in RRC connection state.

In operation S211, the second base station 210 may schedule the terminal 220 to transmit an uplink signal to the first base station 200 based on scheduling parameters. Further, the second base station may transmit scheduling information to the first base station 200 in operation S213. Meanwhile, the scheduling information transmitted by the second base station 210 may include, for example, a cell ID, a radio network temporary identifier (RNTI) of the terminal, a system frame number (SFN), and the like.

The terminal 220 may receive a scheduling signal from the second base station in operation S211 and transmit the uplink signal to the first base station 200.

The first base station 200 may receive the uplink signal from the terminal 220 in operation S221, based on the scheduling information received in operation S213. In the meantime, when the first base station 200 fails to receive the uplink signal from the terminal 220, the first base station 200 may determine that there is a fault in the uplink signal reception, and transmit to an element management system (EMS) or a network management server (NMS) a message containing information about the uplink reception error, e.g., a sleeping cell alarm in operation S205.

Figure 3:
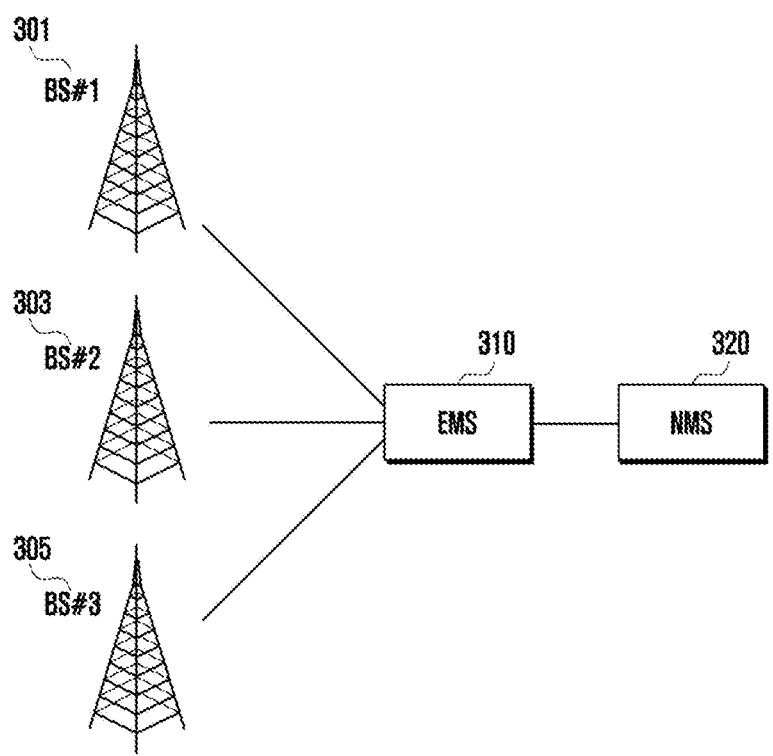
FIG. 3 is a diagram illustrating a plurality of base stations, an element management system (EMS) administrating the plurality of base stations, and an administrator server (e.g., network management system: NMS) according to various embodiments.

FIG. 3 is a diagram illustrating a plurality of base stations, an EMS administrating a plurality of base stations and an administrator server (e.g., network management system (NMS)) according to various embodiments.

Referring to FIG. 3, each of base stations 301, 303 and 305 may periodically generate statistics-related information associated with messages between terminals and/or base stations, and periodically transmit the generated information to the EMS 310. The statistics-related information may include the number of times of radio resource control (RRC) connection establishment success, a rate of RRC connection establishment success, the number of times of RRC connection establishment attempts, a size of downlink data transmission, and base station availability.

The EMS 310 may periodically monitor the base stations through the information received from the base stations 301, 303 and 305, and collect and process management information about the base stations (e.g., information on base station performance, settings, failure, security, etc., or statistics information thereof) to transmit the information to the network management system (NMS) 320 at regular intervals via a management network interface (MNI).

In the meantime, alarm information of the base station may be transmitted to the NMS 320 after its occurrence and delivered to a network administrator via e-mail or over a wired/wireless network. For example, the NMS 320 may process the management information received from the EMS 310 and store it in a database. The stored management information may be provided to the network administrator via a web server, and the administrator may identify and manage current status of the base station network using a web browser or the like.

Figure 4:
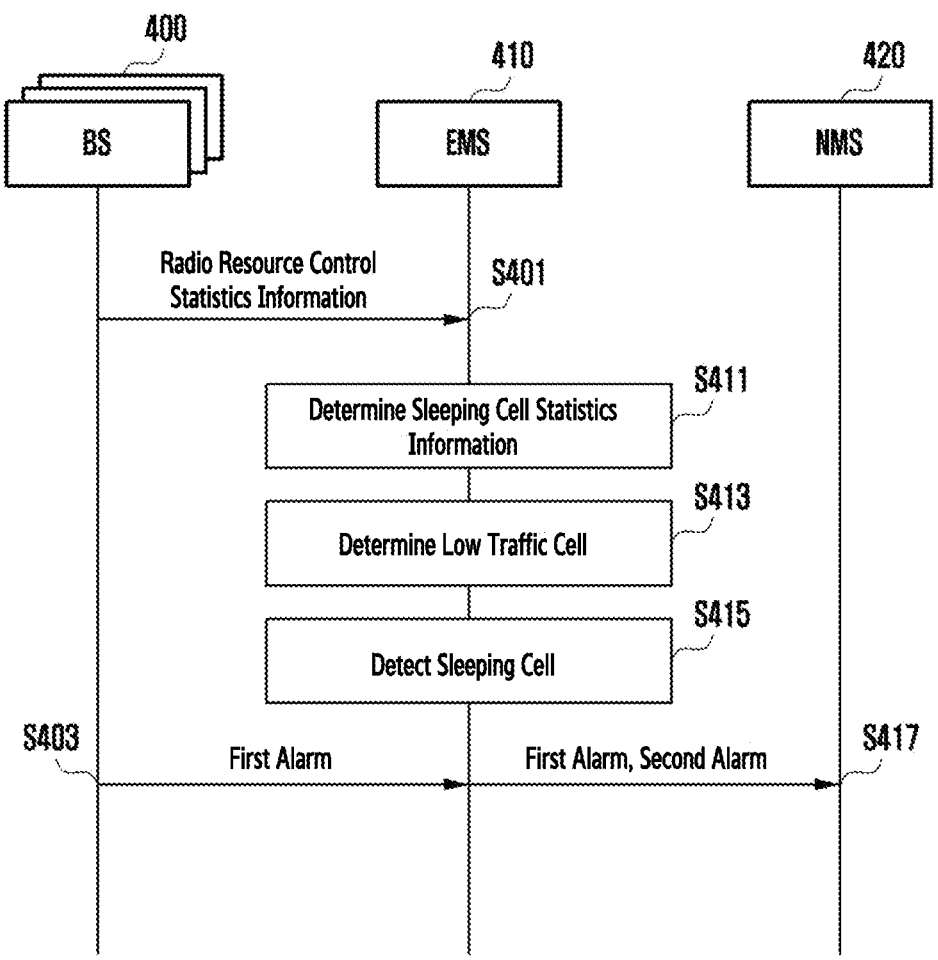
FIG. 4 is a signal flow diagram illustrating example operation of base stations, and an EMS and an NMS managing the base stations according to various embodiments.

FIG. 4 is a signal flow diagram illustrating an example operation of base stations, an EMS managing the base stations and an NMS, according to various embodiments.

Referring to FIG. 4, the base station 400 may generate statistics information related to messages between terminals and/or base stations in operation S401, and transmit the information to the EMS 410. In the present disclosure, the statistics information related to the messages between the terminals and/or the base stations may include statistics information on radio resource control. Further, the base station 400 may generate statistics information related to the messages between the terminals and/or the base stations in operation S401, and transmit the corresponding information to the EMS 410 at a predetermined time interval. For example, the predetermined time interval may correspond to an interval of 15 minutes.

The EMS 410 may determine sleeping cell statistics information for determining a sleeping cell, based on the radio resource control statistics information received from the base station 400 in operation S411.

The EMS 410 may determine a low traffic cell based on the determined sleeping cell statistics information in operation S413. The element management system 410 may detect a sleeping cell from among the base stations except for the base station corresponding to the previously determined low traffic cell amongst the plurality of base stations, in operation S415.

The EMS 410 may generate an alarm for the base station corresponding to the sleeping cell in operation S417, and transmit an alarm message for the base station that is the sleeping cell, to the NMS 420. The alarm message may indicate that the corresponding base station is a sleeping cell or may include information that the base station is a sleeping cell.

The EMS 410 may receive a message containing information about base station transmission/reception error transmitted by the base station 400, in operation S403. Then, the EMS 410 may transmit, to the NMS 420, a message containing information about the received base station reception error and an alarm message for the base station corresponding to the sleeping cell, in operation S417.

Figure 5:
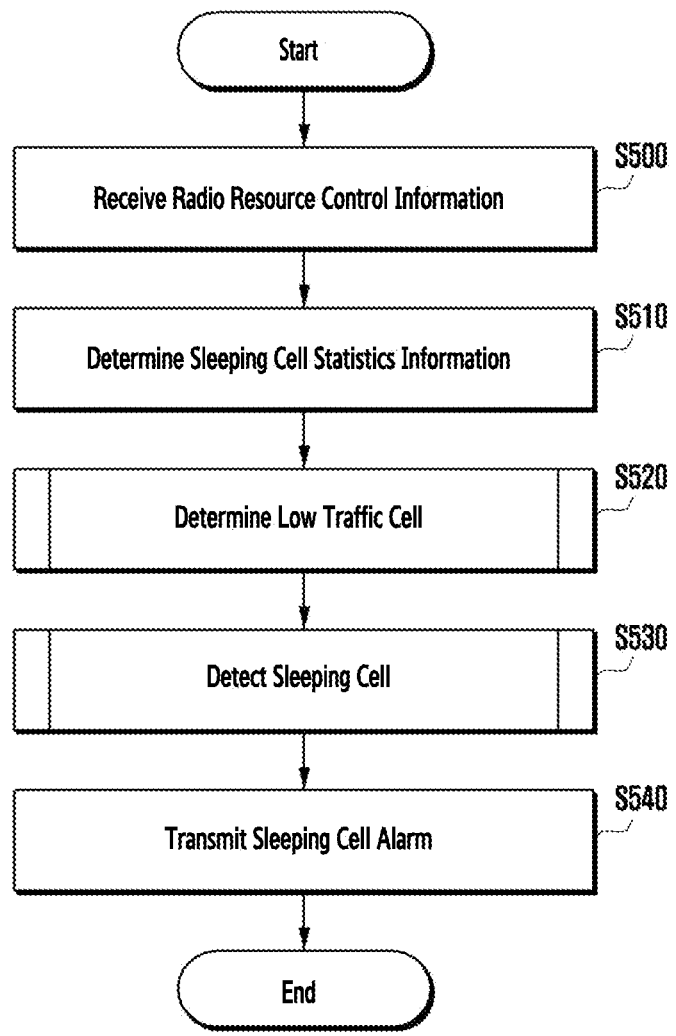
FIG. 5 is a flowchart illustrating example operations in which the EMS detects a base station corresponding to a sleeping cell and reports it to an administrator, according to various embodiments.

FIG. 5 is a flowchart illustrating a example operations in which the EMS detects a base station in an abnormal state and reports it to an administrator according to various embodiments.

Referring to FIG. 5, the EMS may receive radio resource control statistics information from a plurality of base stations, in operation S500. For example, the radio resource control statistics information may include at least one of information about the number of times of RRC connection establishment attempt, the number of times of RRC connection establishment success, a size of downlink data transmission, base station availability, and the like. Meanwhile, according to an embodiment of the present disclosure, the number of times of RRC connection establishment attempt may indicate the number of times each base station performs an RRC connection with the terminal for a certain time period. The number of times of RRC connection establishment success may indicate the number of times each base station performs an RRC connection with the terminal for a certain time period to receive an RRC Connection Complete message from the terminal. The size of downlink data transmission may indicate a data size transmitted by each base station on the downlink channel for a certain time period. The base station availability may refer, for example, to whether the base station normally transmits radio waves for a certain time period.

The EMS may determine sleeping cell statistics information based on radio resource control statistics information received from a plurality of base stations, in operation S510. According to an embodiment of the present disclosure, the sleeping cell statistics information may indicate an average number of times of RRC connection establishment success per day, an average number of times of RRC connection establishment success per hour, an average rate of RRC connection establishment success per hour, an average number of times of RRC connection establishment attempt per hour, an average size of downlink data transmission per day, and a base station availability ratio. In other words, the sleeping cell statistics information may include at least one of the average number of times of RRC connection establishment success per day, the average number of times of RRC connection establishment success per hour, the average rate of RRC connection establishment success per hour, the average number of times of RRC connection establishment attempt per hour, the average size of downlink data transmission per day, and the base station availability ratio. The sleeping cell statistics information will be described in greater detail below with reference to FIGS. 6 and 8.

The EMS may determine a base station corresponding to a low traffic cell, based on the determined sleeping cell statistics information, in operation S520. For example, the EMS may determine (or identify) the base station corresponding to the low traffic cell from among a plurality of base stations, based on the average number of times of RRC connection establishment success per day, the average size of downlink data transmission per day, and the base station availability ratio, included in the sleeping cell statistics information of the EMS. In other words, the EMS may determine the base station corresponding to the low traffic cell from among the plurality of base stations, based on at least one of the average number of times of RRC connection establishment success per day, the average transmission size of downlink data transmission per day, and the base station availability ratio, included in the sleeping cell statistics information.

The EMS may detect the base station corresponding to the sleeping cell based on the determined sleeping cell statistics information, in operation S530. For example, the EMS may detect (or identify or determine) the base station corresponding to the sleeping cell from among a plurality of base stations, based on the average number of times of RRC connection establishment success per hour and the average number of times of RRC connection establishment attempt per hour, included in the sleeping cell statistics information.

Meanwhile, the operations S500 to S540 of FIG. 5 may be performed simultaneously, and some of the operations may be omitted.

For example, in the present disclosure, a configuration for determining the low traffic cell and a configuration for determining the sleeping cell may be implemented independently of each other. In this case, the operations S520 and S530 of FIG. 5 may be independently performed.

In the meantime, throughout the present disclosure, the low traffic cell may correspond to a cell with a small amount of data transmission or connection with the terminal, even when the base station performs normal operation. Accordingly, detecting whether transmission/reception of the base station is abnormal for the low traffic cell may have low accuracy, causing a problem that the amount of operation for detecting the abnormal base station may be increased unnecessarily. Accordingly, according to an embodiment of the present disclosure, when detecting the sleeping cell, it is possible to detect the sleeping cell from among the remaining base stations except for the base station corresponding to the low traffic cell among the plurality of base stations.

The EMS may transmit an alarm message for the detected sleeping cell to an NMS or an administrator server, in operation S540. Alternatively, in operation S540, the EMS may receive a message containing information about the base station uplink reception error from the base station, and transmit the information about the base station uplink reception error and an alarm message for the detected sleeping cell, to the NMS or the administrator server.

Figure 6:
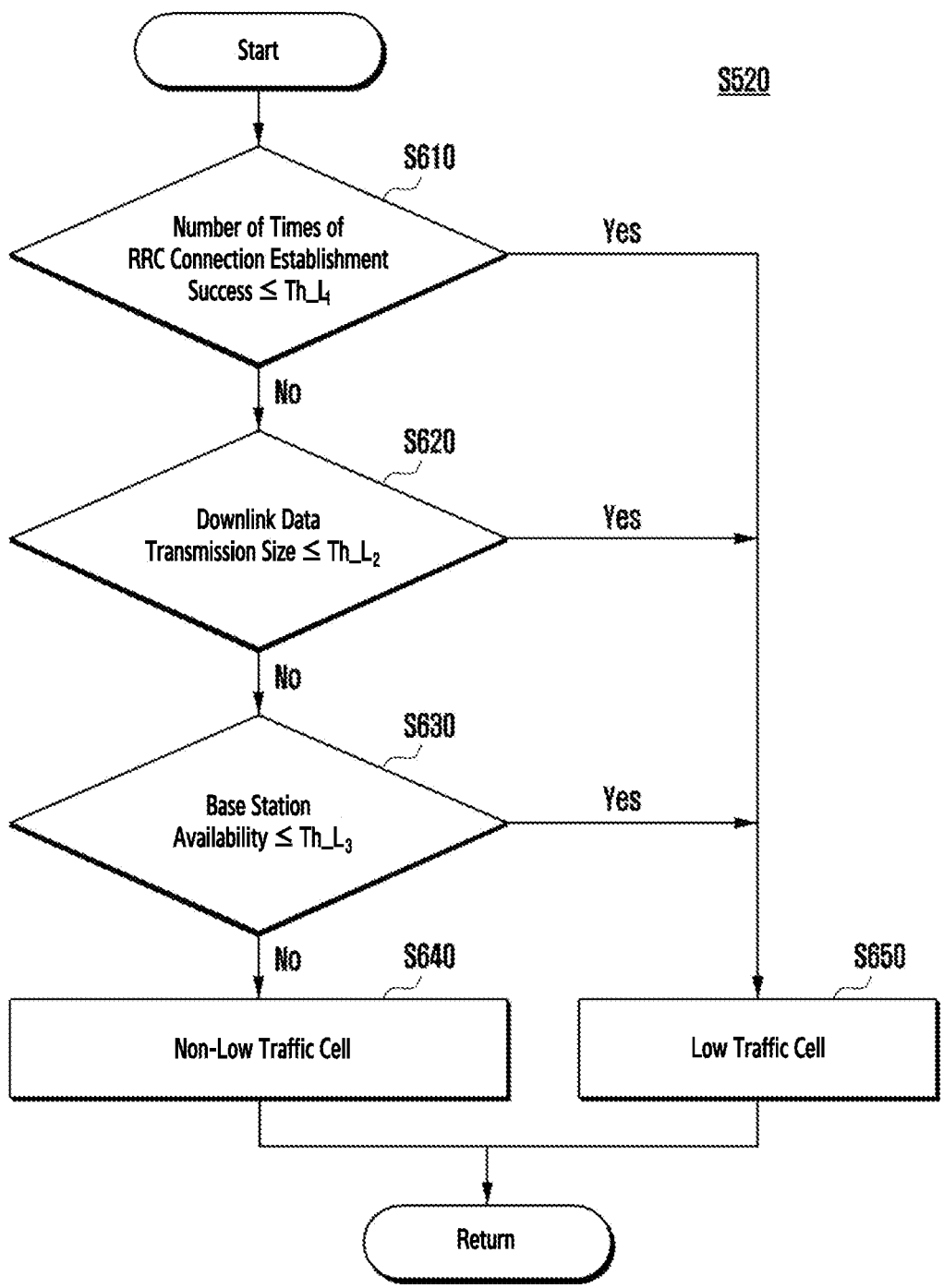
FIG. 6 is a flowchart illustrating an example operation of determining a low traffic cell according to various embodiments.

FIG. 6 is a flowchart illustrating example operations of determining a low traffic cell according to various embodiments.

Table 1 below illustrates example parameters and threshold values in a procedure for determining the low traffic cell.

TABLE 1

| Parameter Name | Description |
| --- | --- |
| Duration_L | low traffic cell detection section (day) |
| Duration_S | sleeping cell detection section (hour) |
| Connection Test Flag | Determine whether to use RRC connection establishment success statistics for low traffic cell determination during Duration_L (ON/OFF). For example, when the Connection Test Flag is set to ON, the RRC connection establishment success statistic may be used to determine low traffic cell during Duration_L. Alternatively, when the Connection Test Flag is set to OFF, the RRC connection establishment success statistics may not be used to determine low traffic cell during Duration_L. |
| Transmission Test Flag | Determine whether to use data transmission statistics for low traffic cell decision during Duration_L (ON/OFF). For example, when the Transmission Test Flag is set to ON, data transmission statistics may be used to determine low traffic cell during Duration_L. Alternatively, when Transmission Test Flag is set to OFF, data transmission statistics may not be used to determine low traffic cell during Duration_L. |
| Availability Test Flag | Determine whether to use cell availability statistics for determining low traffic cell during Duration_S (ON/OFF). For example, when Availability Test Flag is set to ON, cell availability statistics may be used to determine low traffic cell during Duration_L. Alternatively, when Availability Test Flag is set to OFF, cell availability statistics may not be used for determining low traffic cell during Duration_L. |
| Threshold_L1 | Threshold value on daily average statistics of connection establishment collected during Duration_L in case of low traffic cell when performing connection test |
| Threshold_L2 | Threshold value on daily average statistics of downlink Air MAC Byte collected during Duration_L in case of low traffic cell when performing Transmission Test |
| Threshold_L3 | Threshold value on average cell availability ratio during Duration_S in case of normal cell when performing availability test |

According to an embodiment of the present disclosure, the average number of times of RRC connection establishment success per day included in the sleeping cell statistics information may indicate the number of times of RRC connection success by each base station performing an RRC connection attempt on average with the terminal for one day or may indicate the average number of times the base station receives the RRC connection message from the terminal.

It may be expressed as an equation as follows:

RRC Connection Establishment Success per day=Total RRC Connection Establishment Success for Duration_L/Duration_L.

For example, Total RRC Connection Establishment Success for Duration_L may correspond to a total number of times of RRC connection establishment success of the base station during Duration_L period.

According to an embodiment of the present disclosure, a daily average size of downlink data transmission (Downlink Air MAC Byte per day) may indicate a size of data transmitted by each base station on the downlink channel on average for one day.

It may be expressed as an equation as follows:

Downlink Air MAC Byte per day=Total Downlink Air MAC Byte for Duration_L/Duration_L.

For example, Total Downlink Air MAC Byte for Duration_L may correspond to a total size of data transmitted via the downlink channel of the base station during Duration_L period.

According to an embodiment of the present disclosure, the average base station availability ratio per hour (Cell Availability ratio per hour) may stand for a rate at which the base station normally transmits radio waves for a certain time period.

It may be expressed as an equation as follows:

Cell Availability ratio per hour=Total Cell Availability ratio for Duration_S/Duration_S.

For example, the Total Cell Availability ratio for Duration_S may correspond to a total sum of the base station availability ratios during Duration_S.

For convenience of explanation, the operation of determining the low traffic cell according to an example embodiment of the present disclosure is described by way of example together with all the execution processes, but it may be independently performed as ON/OFF operations of Connection Test Flag, Transmission Test Flag, and Availability Test Flag. That is, each flag may be independently set to ON or OFF, and an operation to determine a low traffic cell may be performed according thereto.

Referring then to FIG. 6, description is made of operation S520 of determining the low traffic cell.

The EMS may determine whether the base station corresponds to the low traffic cell based on the daily average number of times of RRC connection establishment success in operation S610, when the Connection Test Flag is turned ON. For example, when the daily average number of times of RRC connection establishment success is equal to or less than a predetermined threshold value (Threshold_L1), the process may proceed to operation S650 to determine the corresponding base station as the low traffic cell.

When the Transmission Test Flag is turned ON, the EMS may determine whether the base station corresponds to the low traffic cell based on the daily average size of downlink data transmission in operation S620. For example, when the daily average size of downlink data transmission is equal to or less than a predetermined threshold value (Threshold_L2), the process may proceed to operation S650 to determine the corresponding base station as the low traffic cell.

The EMS may determine whether the base station corresponds to the low traffic cell based on the hourly average base station availability ratio in operation S630 when the Availability Test Flag is turned ON. For example, when the hourly average base station availability ratio is equal to or less than a predetermined threshold value (Threshold_L3), the EMS may proceed to operation S650 to determine the corresponding base station as the low traffic cell.

In the meantime, when the corresponding base station is not of a low traffic cell, the EMS may determine it as a Non-low traffic cell in operation S640.

On the other hand, according to an embodiment of the present disclosure, the low traffic cell may correspond to a cell with a small amount of connection with the terminal or a small amount of data transmission, even when the base station performs normal operation. Therefore, detecting whether or not transmission/reception of a base station is abnormal for the low traffic cell may have low accuracy, resulting in a problem that the amount of detection operation in the abnormal base station may be unnecessarily increased. According to an embodiment of the present disclosure therefore, when detecting a sleeping cell, it is possible to detect the sleeping cell from among the remaining base stations, except for a base station corresponding to the low traffic cell amongst a plurality of base stations.

Figure 7:
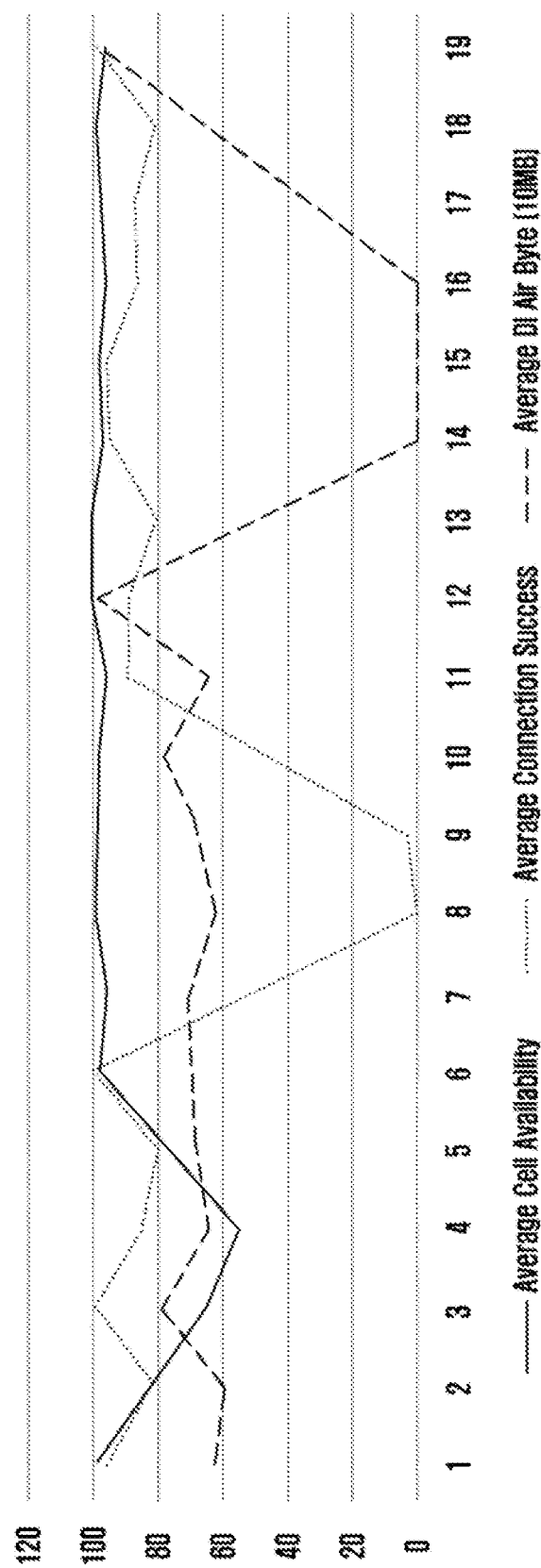
FIG. 7 is a graph illustrating sleeping cell statistics information over time to explain an operation of determining a low traffic cell, according to various embodiments.

FIG. 7 is a graph illustrating sleeping cell statistics information over time to explain an operation of determining a low traffic cell according to various embodiments.

In FIG. 7, description is made to an example of low traffic cell determination operation in the case of Threshold_L1=30, Threshold_L2=100 MB, and Threshold_L3=90%. Meanwhile, this is given only as an example for convenience of description, and the present disclosure is not limited thereto.

In time spans 2 to 5, the average Cell Availability is less than 90%, so the corresponding Cell may be determined as a low traffic cell and excluded from the target for sleeping cell detection.

In time spans 6 to 7, the corresponding base station corresponds to a Non-low traffic cell, and may be the target for sleeping cell detection.

In time spans 8 to 9, the daily average number of times of RRC connection establishment success times is less than 30, so it may be determined as a low traffic cell and excluded from the target for sleeping cell detection.

In time spans 10 to 13, the corresponding base station corresponds to a Non-low traffic cell, and may be the target for sleeping cell detection.

In time spans 14 to 16, the daily average amount of Downlink Air MAC Byte is less than 100 MB, so it may be determined as a low traffic cell and excluded from the target for sleeping cell detection.

In time spans 17 to 19, the corresponding base station corresponds to a Non-low traffic cell, and may be the target for sleeping cell detection.

Figure 8:
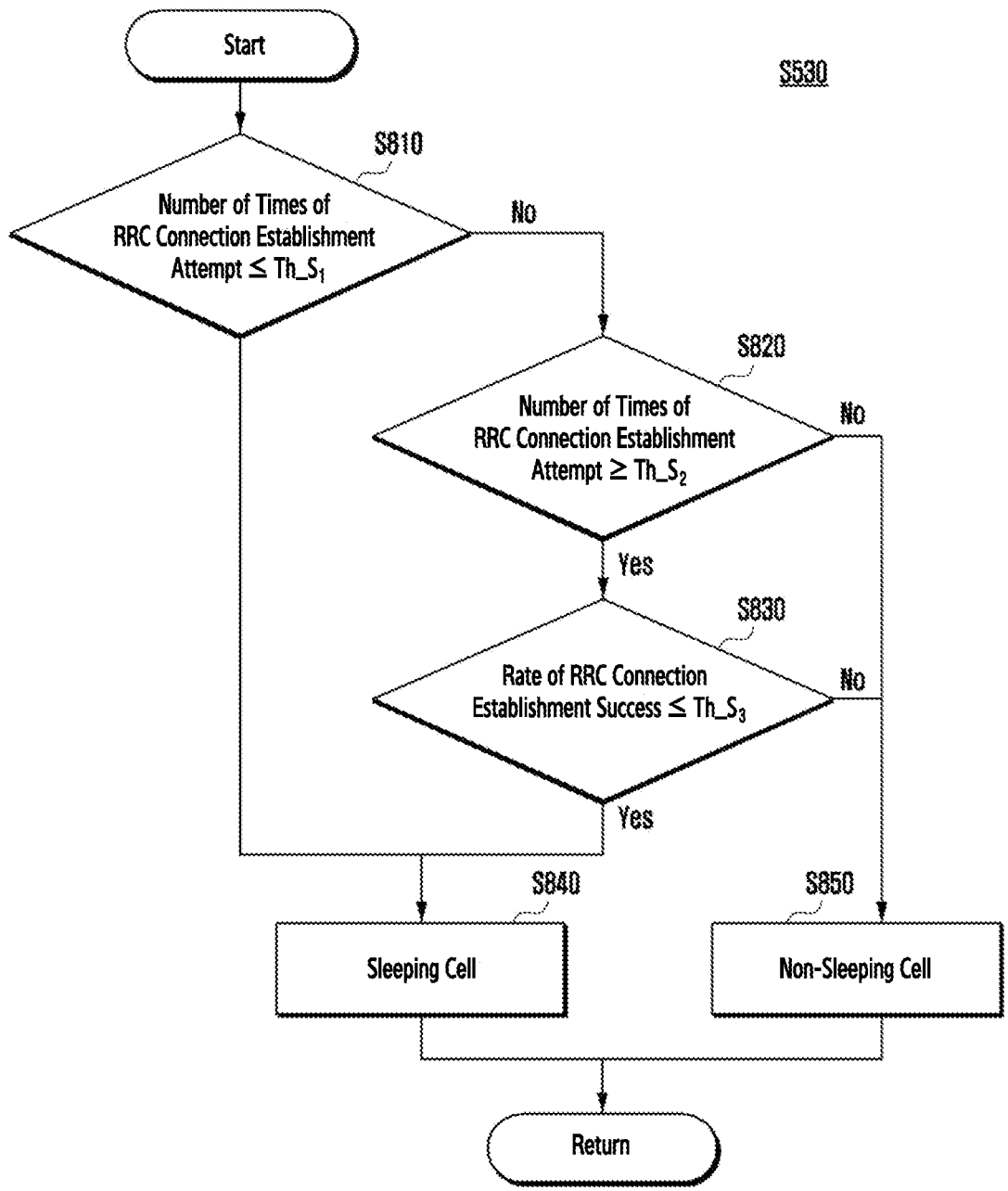
FIG. 8 is a flowchart illustrating an example operation for detecting a base station corresponding to a sleeping cell according to various embodiments.

FIG. 8 is a flowchart illustrating example operations for detecting a base station corresponding to a sleeping cell according to various embodiments.

Table 2 below illustrates parameters and threshold values for the sleeping cell detection process.

TABLE 2

| Parameter Name | Description |
| --- | --- |
| Duration_S | sleeping cell detection section (hour) |
| Attempt Test Flag | Determine whether to use RRC connection establishment attempt statistics for sleeping cell detection during Duration_S (ON/OFF). For example, when Attempt Test Flag is set to ON, RRC connection establishment attempt statistics may be used for sleeping cell detection during Duration_S. Alternatively, when Attempt Test Flag is set to OFF, RRC connection establishment attempt statistics may not be used for sleeping cell detection during Duration_S. |
| Success Rate Test Flag | Determine whether to use RRC connection establishment success rate for sleeping cell detection during Duration_S (ON/OFF). For example, when Success Rate Test Flag is set to ON, RRC connection establishment success rate statistics may be used for sleeping cell detection during Duration_S. Alternatively, when Attempt Test Flag is set to OFF, RRC connection establishment success rate statistics may not be used for sleeping cell detection during Duration_S. |

TABLE 2-continued

| Parameter Name | Description |
| --- | --- |
| Threshold_S1 | Threshold value of RRC connection establishment attempt average statistics collected during Duration_S in case of sleeping cell when performing Attempt Test |
| Threshold_S2 | Threshold value of RRC connection establishment attempt average statistics collected during Duration_S in case of sleeping cell when performing Attempt Test |
| Threshold_S3 | Threshold value of average RRC connection establishment success rate collected during Duration_S in case of sleeping cell when performing Success Rate Test |

According to an embodiment of the present disclosure, the average number of times of RRC connection establishment attempt per hour included in the sleeping cell statistics information may indicate the number of times of RRC connection attempts performed by each base station on average with the terminal per hour.

Expressing the above as an equation, it may be given as follows:

RRC Connection Establishment Attempt per hour=Total RRC Connection Establishment Attemp for Duration_S/Duration_S For example, Total RRC Connection Establishment Attemp for Duration_S may refer, for example, to the total number of times of RRC connection attempts by the corresponding base station with the terminal during Duration_S.

The average RRC connection establishment success rate per hour may indicate a rate of success of each base station performing RRC connection attempts with the terminal on average for one hour.

It may be expressed as an equation as follows:

Connection Success Rate per hour=Total RRC Connection Establishment Success for Duration_S/Total RRC Connection Establishment Attempt for Duration_S.

For example, Total RRC Connection Establishment Success for Duration_S may indicate the total number of times of RRC connection success by the base station performing a connection attempt with the terminal for Duration_S, and Total RRC Connection Establishment Attemp for Duration_S may indicate the total number of times of connection attempts by the base station performing a connection attempt with the terminal for Duration_S.

In the meantime, for convenience of description, the operation of detecting the sleeping cell according to an embodiment of the present disclosure has been described together with all the execution processes, but it may be independently performed with ON/OFF operations of Attempt Test Flag and Success Rate Test Flag. In other words, each flag may be independently set to ON or OFF, and an operation to determine the sleeping cell may be performed according thereto.

Hereinafter, referring to FIG. 8, description is made of operation S520 of detecting the sleeping cell.

The EMS may detect whether the base station corresponds to the sleeping cell, based on the average number of times of RRC connection establishment attempt per hour in operation S810, when the Attempt Test Flag is turned ON. For example, when the average number of times of RRC connection establishment attempts per hour is equal to or less than a predetermined threshold value (Threshold_S1), the process may proceed to operation S840 to detect (or confirm or determine) the corresponding base station as a sleeping cell.

When the average number of times of RRC connection establishment attempts per hour of the corresponding base station exceeds the predetermined threshold value (Threshold_S1), the EMS may proceed to operation S820 to determine whether the average number of times of RRC connection establishment attempt per hour is equal to or more than a predetermined threshold value (Threshold_S2). Then, the EMS may proceed to operation S830 when the average number of times of RRC connection establishment attempt per hour of the corresponding base station is equal to or more than the threshold value Threshold_S2, and it may perform detecting the sleeping cell based on the average rate of RRC connection establishment success per hour, when the Success Rate Test Flag is ON.

When the average rate of RRC connection establishment success per hour of the corresponding base station is less than or equal to a predetermined threshold value (Threshold_S3), the EMS may proceed to operation S840 to detect the corresponding base station as a sleeping cell.

Meanwhile, the EMS may determine the base station that does not correspond to the sleeping cell, as a Non-sleeping cell in operation S850.

Throughout the disclosure, the sleeping cell may refer to a cell for which an administrator does not recognize its fault because a base station fails to notify the administrator of an abnormal state via an alarm means or the like, even though the base station is in an abnormal state that cannot accept new calls owing to various errors. The EMS may generate an alarm message for the detected sleeping cell for management of base stations, and transmit the generated message to a network management system or an administrator server. Further, an alarm message may be generated by adding information included in a message containing information on the uplink reception error of a corresponding base station, the message being previously received from the base station.

In the meantime, according to an embodiment of the present disclosure, an operation of low traffic cell determination and sleeping cell detection of the EMS may be periodically performed at a predetermined time interval.

When such a periodic operation of low traffic cell determination and sleeping cell detection is performed at a predetermined time interval, there may occur an occasion corresponding to the low traffic cell during the sleeping cell detection operation. In that occasion, the EMS may not perform the sleeping cell detection for the corresponding base station and may consider that the corresponding base station maintains the existing state. In other words, when the EMS determines that the existing base station corresponds to the sleeping cell and then determines that it corresponds to the low traffic cell in a next period, the EMS may determine that the base station corresponds to the sleeping cell to generate an alarm message, and transmit the generated message to the network management system or the administrator server.

When the EMS determines that the existing base station corresponds to the Non-sleeping cell and then determines that it corresponds to the low traffic cell in the next period, the element management system may determine that the corresponding base station corresponds to the Non-sleeping cell.

Figure 9:
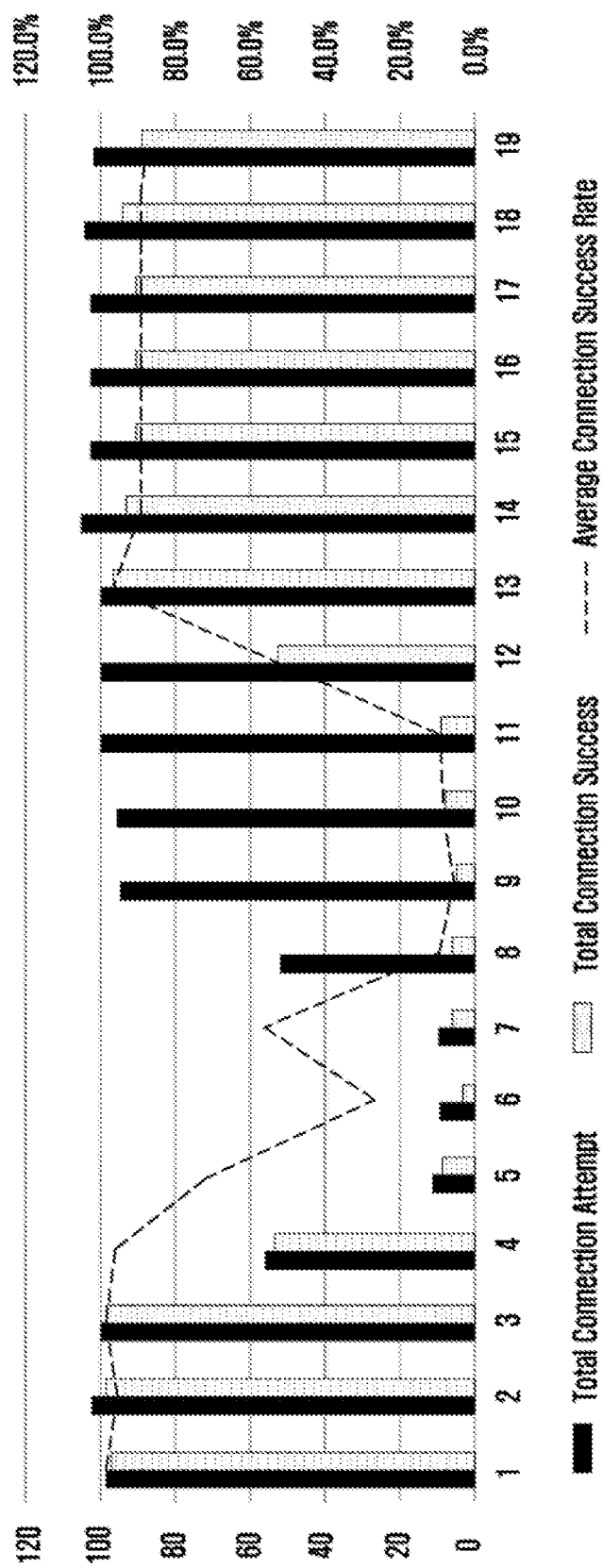
FIG. 9 is a graph illustrating Sleeping statistics information over time to explain an operation of detecting a base station corresponding to a sleeping cell, according to various embodiments.

FIG. 9 is a graph illustrating sleeping cell statistics information over time to explain an operation of detecting a base station corresponding to a sleeping cell according to various embodiments.

FIG. 9 illustrates an example of the sleeping cell detection operation when Threshold_S1=30, Threshold_S2=60, and Threshold_S3=80%. Further, it is assumed that the corresponding base station does not correspond to the low traffic cell. On the other hand, it is to be noted that it is presented only as an example for convenience of description, and the present disclosure is not limited thereto.

In time spans 1 to 4, the corresponding base station may be determined as a normal cell.

In time span 5, a total sum of the number of times of RRC connection establishment attempts is less than 30, so the corresponding base station may be detected as a sleeping cell by the Attempt Test. Accordingly, a sleeping cell Alarm may be generated.

In time spans 6 to 7, the corresponding base station may maintain the sleeping cell Alarm.

In time span 8, the corresponding base station is determined to be a normal base station. As such, the sleeping cell Alarm may be released.

In time span 9, the base station may be detected as a sleeping cell by the Success Rate Test, because the total sum of the number of times of RRC connection establishment attempt is equal to or more than 60 and the average rate of RRC connection establishment success per hour is less than 80%. Accordingly, a sleeping cell Alarm for the corresponding base station may be generated.

In time span 10 to 12, the sleeping cell Alarm of the corresponding base station may be maintained.

In time span 13, the corresponding base station may be determined as a normal Cell. As such, the sleeping cell Alarm may be released.

On the other hand, when the 5G base station according to the present disclosure operates in non-standalone architecture (NSA) mode, all the RRC connection attempts of the terminal are performed in the 4G base station and the RRC connection is not performed for the 5G base station. Thus, it may be necessary for additional statistics information to be considered for more accurate low traffic cell determination or sleeping cell detection. Hereinafter, more detailed description will be made with reference to FIGS. 10 to 13.

Figure 10:
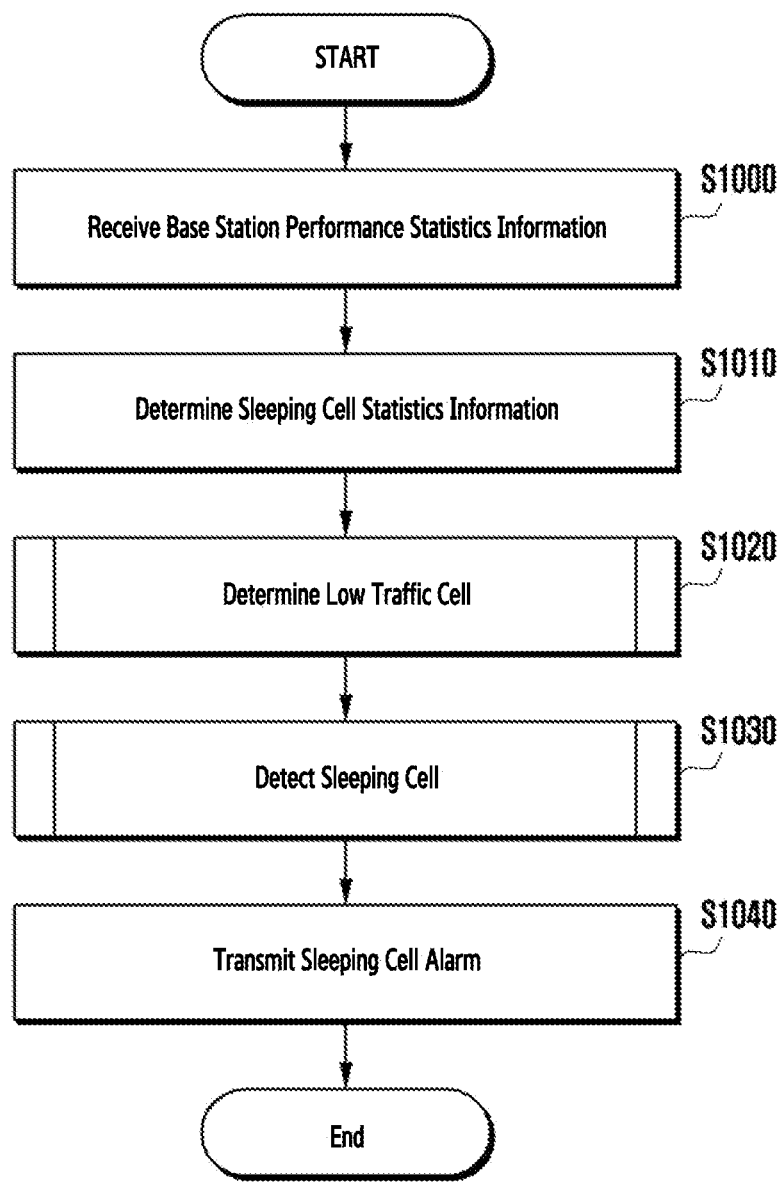
FIG. 10 is a flowchart illustrating example operations in which the EMS detects a base station corresponding to a sleeping cell, and reports it to an administrator, according to various embodiments.

FIG. 10 is a flowchart illustrating example operations in which the EMS detects a base station corresponding to a sleeping cell and reports it to an administrator according to various embodiments.

Referring now to FIG. 10, in operation S1000, the EMS may receive base station performance statistics information from a plurality of base stations. For example, the base station performance statistics information may include at least one of the information on the number of times of RRC connection establishment attempt, the number of times of EN-DC X2 message exchange procedure (e.g., message exchange procedure for EN-DC mobility) attempt, the number of times of Xn message exchange procedure (e.g., Xn handover) attempt, the number of times of successful RRC connection establishment, the number of times of EN-DC X2 message exchange procedure success, the number of times of Xn message exchange procedure success, a downlink data transmission size, a base station availability ratio or the like. In the meantime, according to an embodiment of the present disclosure, the number of times of RRC connection establishment attempt may indicate the number of times each base station performs an RRC connection with a terminal during a specific period. In the present disclosure, the number of times of EN-DC X2 message exchange procedure attempt may indicate the number of times each base station performs an EN-DC X2 message exchange procedure (e.g., message exchange for EN-DC mobility) with a neighboring base station during a specific period. The number of times of Xn message exchange procedure attempt may indicate the number of times each base station performs an Xn message exchange procedure (e.g., message exchange for Xn handover) with a neighboring base station during a specific period. The number of times of RRC connection establishment success may indicate the number of times each base station performs an RRC connection with a terminal for a specific period and receives an RRC Connection Complete message from the terminal. In the present disclosure, the number of times of EN-DC X2 message exchange procedure success may indicate the number of times each base station successfully completes the EN-DC X2 message exchange procedure with a neighboring base station for a specific period. The number of times of Xn message exchange procedure success may indicate the number of times each base station successfully completes the Xn message exchange procedure with a neighboring base station for a specific period. The downlink data transmission size may indicate a data size transmitted by each base station on the downlink channel for a specific period. The base station availability may stand for whether the base station normally transmits radio waves for a specific period.

The EMS may determine sleeping cell statistics information based on the base station performance statistics information received from a plurality of base stations, in operation S1010. According to an embodiment of the present disclosure, the sleeping cell statistics information may include at least one of the information on the average number of times of RRC Connection Establishment Success per day, the average number of times of EN-DC X2 message exchange procedure success per day, the average number of times of Xn message exchange procedure success per day, the number of times of RRC connection establishment success per hour, the number of times of EN-DC X2 message exchange procedure success per hour, the number of times of Xn message exchange procedure success per hour, the average rate of RRC connection establishment success per hour, the average number of times of RRC connection establishment attempt per hour, the average number of times of EN-DC X2 message exchange procedure attempt per hour, the average number of times of Xn message exchange procedure attempt per hour, the daily average size of downlink data transmission, and the base station availability ratio.

The EMS may determine a base station corresponding to the low traffic cell based on the determined sleeping cell statistics information, in operation S1020. For example, the EMS may determine (or identify) the base station corresponding to the low traffic cell amongst a plurality of base stations, based on at least one of the daily average number of times of RRC connection establishment, the daily average number of times of EN-DC X2 message exchange procedure success, the daily average number of times of Xn message exchange procedure success, the daily average size of downlink data transmission, the base station availability ratio, included in the sleeping cell statistics information.

The EMS may detect a base station corresponding to the sleeping cell based on the determined sleeping cell statistics information, in operation S1030. For example, the EMS may detect (or identify or determine) the base station corresponding to the sleeping cell amongst a plurality of base stations based on at least one of the average ratio of RRC connection establishment success per hour, the average ratio of EN-DC X2 message exchange procedure success per hour, the average ratio of Xn message exchange procedure success per hour, the average number of times of RRC connection establishment attempt per hour, the average number of times of EN-DC X2 message exchange procedure attempt per hour, and the average number of times of Xn message exchange procedure attempt per hour, included in the sleeping cell statistics information.

Meanwhile, the operations S1000 to S1040 of FIG. 10 may be performed simultaneously, and some of the operations may be omitted.

For example, in the present disclosure, a configuration for determining the low traffic cell and a configuration for determining the sleeping cell may proceed independently of each other. In this context, the operations S1020 and S1030 of FIG. 10 may be independently performed.

Meanwhile, in the present disclosure, the low traffic cell may correspond to a cell with a small amount of data transmission or a small amount of connection with the terminal, even when the base station operates normally. Accordingly, there may be a problem in that detecting whether transmission/reception of the base station is abnormal for the low traffic cell may have low accuracy, and the amount of operation for detecting the abnormal base station may be increased unnecessarily. As such, according to an embodiment of the present disclosure, in detecting the sleeping cell, it is possible to detect the sleeping cell from among the remaining base stations except for the base station corresponding to the low traffic cell amongst the plurality of base stations.

The EMS may transmit an alarm message for the detected sleeping cell to the NMS or the administrator server in operation S1040. Alternatively, in operation S1040, the EMS may receive a message containing information on the uplink reception error of the base station from the base station, and transmit the information on the uplink reception error of the corresponding base station and the alarm message for the detected sleeping cell, to the NMS or the administrator server.

Figure 11:
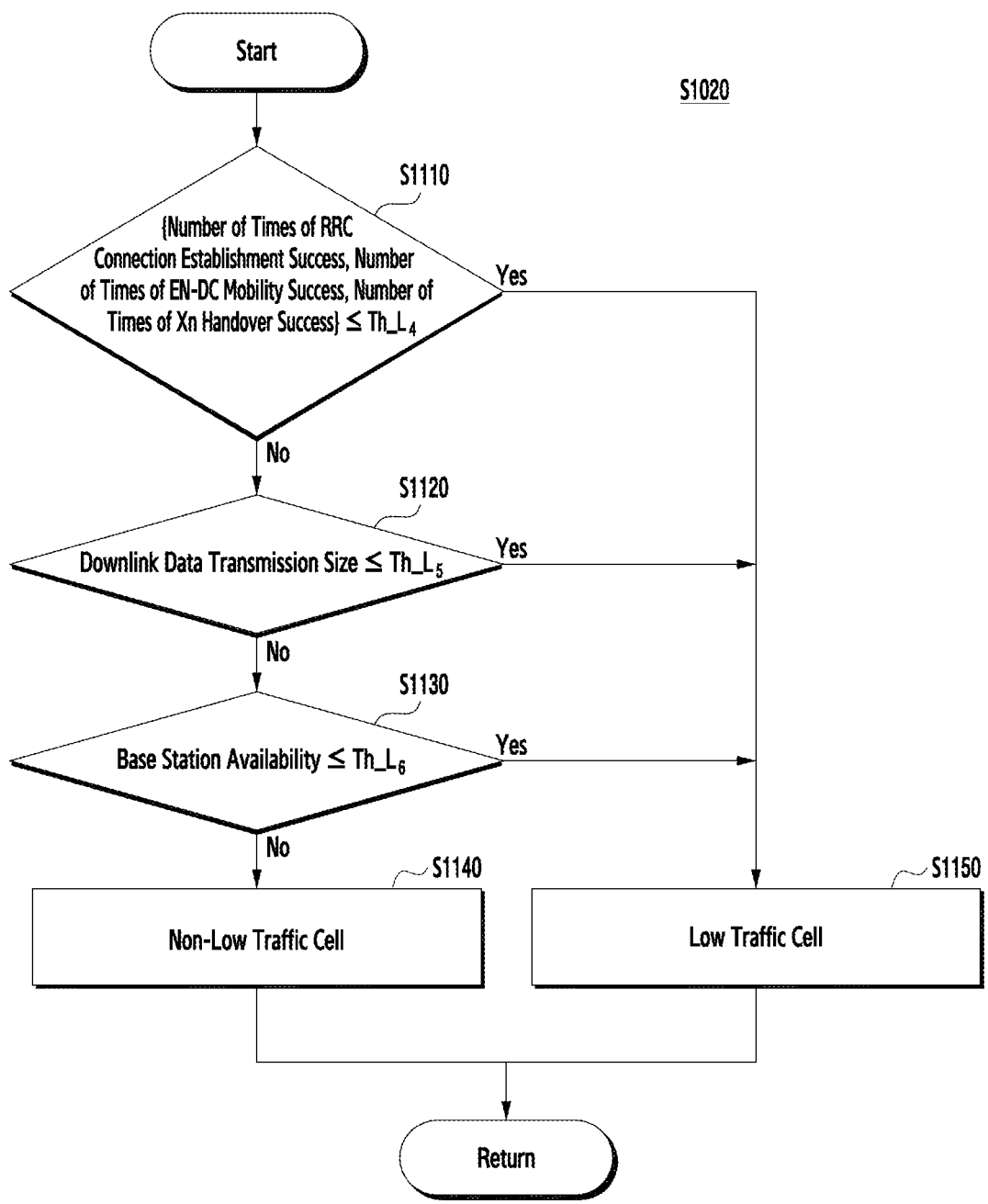
FIG. 11 is a flowchart illustrating an example operation of determining a low traffic cell according to various embodiments.

FIG. 11 is a flowchart illustrating an example of operation S1020 of determining a low traffic cell according to various embodiments.

Table 3 below illustrates parameters and threshold values for the low traffic cell determination procedure.

TABLE 3

| Parameter Name | Description |
|---|---|
| Duration_L | low traffic cell detection section (day) |
| Duration_S | sleeping cell detection section (hour) |
| Connection Test Flag | Determine whether to use RRC Connection Establishment, EN-DC mobility, or Xn Handover Success statistics for low traffic cell determination during Duration_L (ON/OFF). For example, when Connection Test Flag is set to ON, RRC Connection Establishment, EN-DC mobility, or Xn Handover Success statistics may be used for low traffic cell determination during Duration_L. Alternatively, when Connection Test Flag is set to OFF, RRC Connection Establishment, EN-DC mobility, or Xn Handover Success statistics may not be used for low traffic cell determination during Duration_L. |
| Transmission Test Flag | Determine whether to use Data Transmission statistics for low traffic cell determination during Duration_L (ON/OFF). For example, when Transmission Test Flag is set to ON, Data Transmission statistics may be used for low traffic cell determination during Duration_L. Alternatively, when Transmission Test Flag is set to OFF, Data Transmission statistics may not be used for low traffic cell determination during Duration_L |
| Availability Test Flag | Determine whether to use Cell Availability statistics for low traffic cell determination during Duration_S (ON/OFF). For example, when Availability Test Flag is set to ON, Cell Availability statistics may be used to low traffic cell determination during Duration_L. Alternatively, when Availability Test Flag is set to OFF, Cell Availability statistics may not be used for low traffic cell determination during Duration_L. |
| Threshold_L4 | Threshold value on {Connection Establishment + EN-DC mobility + Xn Handover} Success daily average statistics collected during Duration_L, for low traffic cell when performing Connection Test |
| Threshold_L5 | Threshold value on Downlink Air MAC Byte daily average statistics collected during Duration_L, for low traffic cell when performing Transmission Test |
| Threshold_L6 | Threshold value on average Cell Availability ratio during Duration_S, for normal Cell when performing Availability Test |

According to an embodiment of the present disclosure, the daily average number of times of RRC Connection Establishment Success included in the sleeping cell statistics information may indicate the number of times of RRC Connection Success of each base station performing an RRC connection attempt with a terminal on average for one day, or it may indicate the daily average number of times of the base station receiving an RRC Connection message from the terminal.

It may be expressed as an equation as follows:

RRC Connection Establishment Success per day=Total RRC Connection Establishment Success for Duration_L/Duration_L.

For example, Total RRC Connection Establishment Success for Duration_L may correspond to the total number of times of RRC connection establishment success of the base station during Duration_L period.

The average number of times of EN-DC Mobility (EN-DC X2 message exchange procedure) success per day may indicate the number of times of successful attempts by an NSA (Non-standalone Architecture) terminal attempting to move between cells on average per day at each base station.

It may be expressed as an equation as follows:

EN-DC Mobility Success per day=Total EN-DC Mobility Success for Duration_L/Duration_L.

The average number of times of Xn Handover (Xn message exchange procedure) successes per day may indicate the number of times of successful attempts by a SA (Standalone Architecture) terminal attempting to move between cells on average per day at each base station.

It may be expressed as an equation as follows:

Xn Handover Success per day=Total Xn Handover Success for Duration_L/Duration_L.

According to an embodiment of the present disclosure, the daily average size of downlink data transmission (Downlink Air MAC Byte per day) may indicate the size of data transmitted by each base station on the downlink channel on average for one day.

It may be expressed by an equation as follows:

Downlink Air MAC Byte per day=Total Downlink Air MAC Byte for Duration_L/Duration_L.

For example, Total Downlink Air MAC Byte for Duration_L may correspond to the total size of data transmitted on the downlink channel of the base station during Duration_L period.

According to an embodiment of the present disclosure, the average base station availability ratio per hour (Cell Availability ratio per hour) may refer, for example, to a rate at which the base station normally transmits radio waves during a specific period.

It may be expressed as a following equation:

Cell Availability ratio per hour=Total Cell Availability ratio for Duration_S/Duration_S.

For example, Total Cell Availability ratio for Duration_S may correspond to the total sum of the base station availability ratio during Duration_S.

Although the operation of determining the low traffic cell according to an embodiment of the present disclosure is described together with all the execution processes for convenience of explanation, it may be independently performed as ON/OFF operations of the Connection Test Flag, Transmission Test Flag, and Availability Test Flag. In other words, each flag may be independently set to ON or OFF, and an operation of determining the low traffic cell may be performed according thereto.

Referring then to FIG. 11, description is made to operation S1020 of determining the low traffic cell.

When the Connection Test Flag is turned ON, the EMS may determine whether the base station corresponds to the low traffic cell, based on the daily average number of times of the RRC connection establishment success, the daily average number of times of EN-DC X2 message exchange procedure success, and the daily average number of times of Xn message exchange procedure success, in operation S1110. For example, when the value determined according to the sum of the number of times of RRC connection establishment success, the number of times of EN-DC Mobility success, and the number of times of Xn Handover success, or a combination thereof corresponds to a predetermined threshold value (Threshold_L4) or less, the EMS may proceed to operation S1150 to determine the corresponding base station as a low traffic cell.

When the Transmission Test Flag is turned ON, the EMS may determine whether the base station corresponds to the low traffic cell based on the daily average size of downlink data transmission in operation S1120. For example, when the daily average size of downlink data transmission is equal to or less than a predetermined threshold value (Threshold_L5), the EMS may proceed to operation S1150 to determine the corresponding base station as a low traffic cell.

When the Availability Test Flag is turned ON, the EMS may determine whether the base station corresponds to the low traffic cell based on the hourly average base station availability ratio in operation S1130. For example, when the hourly average base station availability ratio is equal to or less than a predetermined threshold value (Threshold_L6), the EMS may proceed to operation S1150 to determine the corresponding base station as a low traffic cell.

In the meantime, when the corresponding base station is not a low traffic cell, the EMS may determine the base station a Non-low traffic cell in operation S1140.

On the other hand, according to an embodiment of the present disclosure, the low traffic cell may correspond to a cell with a small amount of connection or a small amount of data transmission with the terminal even when the base station performs a normal operation. Therefore, detecting whether transmission/reception of the base station is abnormal for the low traffic cell may have low accuracy, leading to a problem that the amount of operation for detecting the abnormal base station may be unnecessarily increased. Therefore, according to an embodiment of the present disclosure, when detecting a sleeping cell, it is possible to detect the sleeping cell from among the remaining base stations except for a base station corresponding to a low traffic cell amongst a plurality of base stations.

Figure 12:
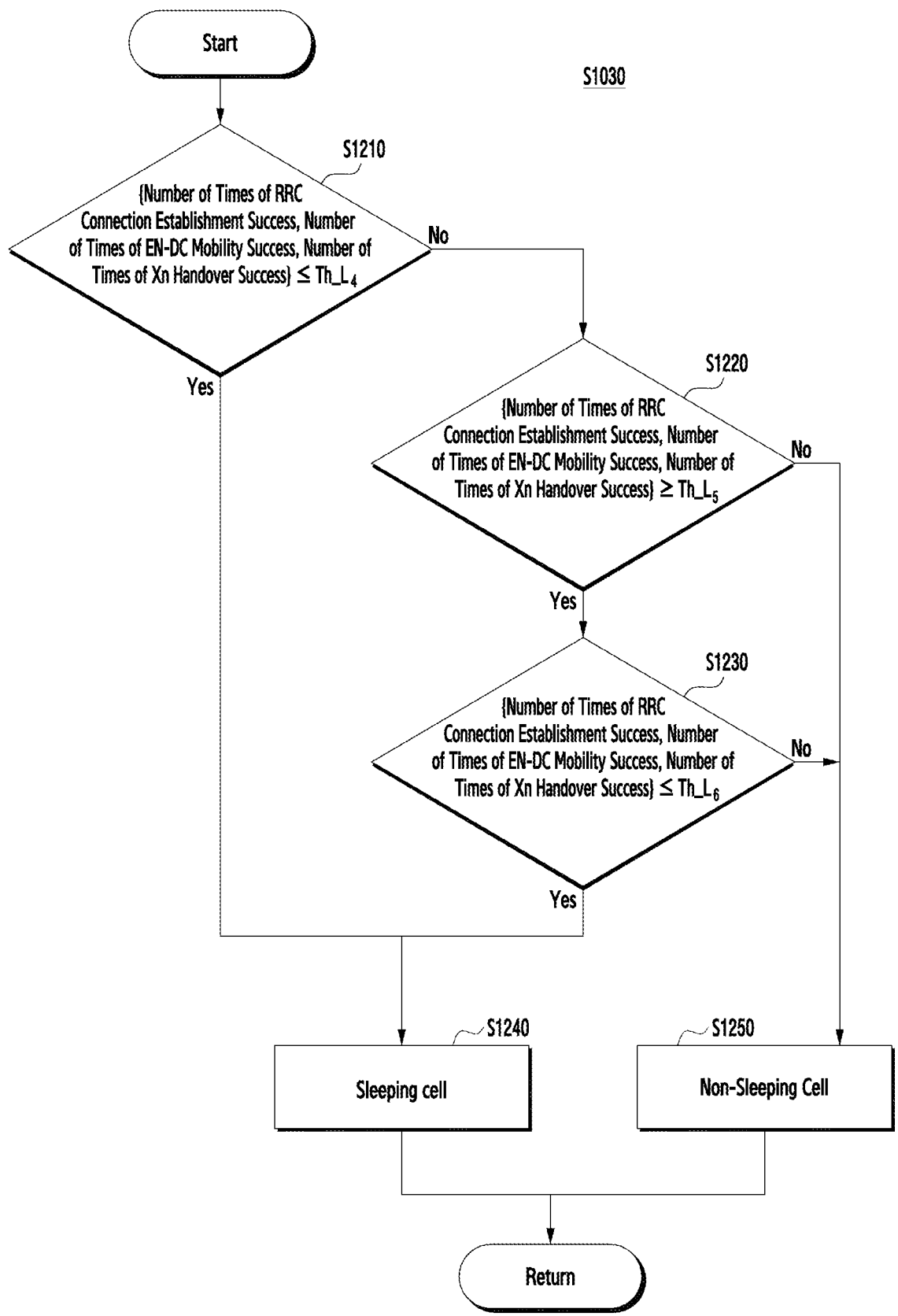
FIG. 12 is a flowchart illustrating an example operation for detecting a base station corresponding to a sleeping cell according to various embodiments.

FIG. 12 is a flowchart illustrating an example operation of detecting a sleeping cell according to various embodiments.

Table 4 below illustrates parameters and threshold values for a sleeping cell detection process.

TABLE 4

| Parameter Name | Description |
| --- | --- |
| Duration_S | sleeping cell detection section (hour) |
| Attempt Test Flag | Determine whether to use RRC Connection Establishment, EN-DC Mobility, and Xn Handover Attempt statistics for sleeping cell detection during Duration_S (ON/OFF). For example, when Attempt Test Flag is set to ON, RRC Connection Establishment, EN-DC Mobility, and Xn Handover Attempt statistics may be used for sleeping cell detection during Duration_S. Alternatively, when Attempt Test Flag is set to OFF, RRC Connection Establishment, EN-DC Mobility, and Xn Handover Attempt statistics may not be used for sleeping cell detection during Duration_S. |
| Success Rate Test Flag | Determine whether to use RRC Connection Establishment, EN-DC Mobility, and Xn Handover Success Rate for sleeping cell detection during Duration_S (ON/OFF). For example, when Success Rate Test Flag is set to ON, RRC Connection Establishment, EN-DC Mobility, Xn Handover Success Rate statistics may be used for sleeping cell detection during Duration_S. Alternatively, when Attempt Test Flag is set to OFF, RRC Connection Establishment, EN-DC Mobility, and Xn Handover Success Rate statistics may not be used for sleeping cell detection during Duration_S. |
| Threshold_S4 | Threshold value of {RRC Connection Establishment + EN-DC Mobility + Xn Handover} Attempt average statistics collected during Duration_S, for sleeping cell when performing Attempt Test |
| Threshold_S5 | Threshold value of {RRC Connection Establishment + EN-DC Mobility + Xn Handover} Attempt average statistics collected during Duration_S, for sleeping cell when performing Attempt Test |
| Threshold_S6 | Threshold value of {RRC Connection Establishment + EN-DC Mobility + Xn Handover} Success Rate average collected during Duration_S, for sleeping cell when performing Success Rate Test |

According to an embodiment of the present disclosure, the hourly average number of times of RRC connection establishment attempts included in the sleeping cell statistics information (RRC Connection Establishment Attempt per hour) may indicate the number of times of RRC connection attempts performed by each base station on average with the terminal per hour.

It may be expressed as an equation as follows:

RRC Connection Establishment Attempt per hour=Total RRC Connection Establishment Attemp for Duration_S/Duration_S.

For example, Total RRC Connection Establishment Attemp for Duration_S may refer, for example, to the total number of times of RRC connection attempts by the corresponding base station with the terminal during Duration_S.

The number of times of EN-DC Mobility (EN-DC X2 message exchange procedure) attempt per hour may indicate the average number of times an NSA (Non-standalone Architecture) terminal attempts to move between cells for one day in each base station.

It may be expressed as an equation as follows:

EN-DC Mobility Attempt per hour=Total EN-DC Mobility Attempt for Duration_S/Duration_S.

The number of times of Xn Handover (Xn message exchange procedure) attempts per hour may indicate the number of times an NSA (Non-standalone Architecture) terminal attempts to move between cells on average for a day in each base station.

It may be expressed as an equation as follows:

Xn Handover Attempt per hour=Total Xn Handover Attempt for Duration_S/Duration_S.

The success rates of the hourly average RRC connection establishment, EN-DC X2 message exchange procedure, and Xn message exchange procedure may indicate the success rates of each base station performing RRC Connection, EN-DC Mobility, and Xn Handover attempts on average with the terminal for one hour.

It may be expressed as an equation as follows:

Connection Success Rate per hour={Total RRC Connection Establishment Success for Duration_S+ Total EN-DC Mobility Success for Duration_S+ Total Xn Handover Success for Duration_S}/ {Total RRC Connection Establishment Attempt for Duration_S+Total EN-DC Mobility Attempt for Duration_S+Total Xn Handover Attempt for Duration_S}.

In the meantime, the operation of detecting the sleeping cell according to an embodiment of the present disclosure has been described together with all the execution processes for the convenience of explanation, but it may be independently performed as ON/OFF operations of Attempt Test Flag and Success Rate Test Flag. In other words, each flag may be independently set to ON or OFF, and an operation of determining a low traffic cell may be performed according thereto.

Referring then FIG. 12, description is made of operation S1030 of detecting the sleeping cell.

When the Attempt Test Flag is turned ON, the EMS may detect whether the base station corresponds to the sleeping cell based on the hourly average number of times of attempts of RRC connection establishment, the EN-DC X2 message exchange procedure, and the Xn message exchange procedure, in operation S1210. For example, when a value determined according to a sum of the number of times of RRC connection establishment attempt, the number of times of EN-DC X2 message exchange procedure attempt, and the number of times of Xn message exchange procedure attempt, or a combination thereof, corresponds to a predetermined threshold value (Threshold_S4) or less, the EMS may proceed to operation S1240 to detect (or identify or determine) the corresponding base station as a sleeping cell.

When the value determined according to a sum of the hourly average number of times of RRC connection establishment attempt, the hourly average number times of EN-DC X2 message exchange procedure attempt, and the hourly average number of times of Xn message exchange procedure attempt, of the corresponding base station, or a combination thereof exceeds a predetermined threshold value (Threshold_S4), the EMS may proceed to operation S1220 to determine whether the value determined according to the sum of the hourly average number of times of RRC connection establishment attempt, the hourly average number of times of EN-DC X2 message exchange procedure attempt, and the hourly average number of times of Xn message exchange procedure attempt, or a combination thereof is equal to or more than a predetermined threshold value (Threshold_S5). When the value determined according to the sum of the hourly average number of times of RRC connection establishment attempt, the hourly average number of times of EN-DC X2 message exchange procedure attempt, and the hourly average number of times of Xn message exchange procedure attempt, of the corresponding base station, or a combination thereof is equal to or more than the threshold value (Threshold_S5), the EMS may proceed to operation S1230, and then, when the Success Rate Test Flag is ON, it may perform the sleeping cell detection based on the hourly average rates of RRC connection establishment success, EN-DC X2 message exchange procedure success, and Xn message exchange procedure success.

When the value determined according to a sum of the hourly average rates of RRC connection establishment success, EN-DC X2 message exchange procedure success, and Xn message exchange procedure success of the corresponding base station, or a combination thereof is equal to or less than a predetermined threshold value (Threshold_S6), the EMS may proceed to operation S1240 to detect the corresponding base station as a sleeping cell.

Meanwhile, the EMS may determine a base station that does not correspond to the sleeping cell, as a Non-sleeping cell in operation S1250.

Throughout the disclosure, the sleeping cell may refer to a cell for which an administrator does not recognize its failure because a base station does not notify the administrator of an abnormal state via an alarm means or the like, even though the base station is in an abnormal state that cannot accept new calls owing to various errors. The EMS may generate an alarm message for the detected sleeping cell for management of base stations, and transmit the generated message to a network management system or an administrator server. Further, the EMS may generate an alarm message by adding information included in a message containing information on an uplink reception error of a base station, previously received from the base station.

Meanwhile, according to an embodiment of the present disclosure, the operation of low traffic cell determination and the sleeping cell detection of the EMS may be periodically performed at a predetermined time interval.

When a periodic operation of low traffic cell determination and sleeping cell detection is performed at a predetermined time interval, there may occur a case corresponding to the low traffic cell during the sleeping cell detection operation. In this case, the EMS may not perform the sleeping cell detection for the corresponding base station, and may consider that the corresponding base station maintains its existing state. In other words, when the EMS determines that the existing base station corresponds to the sleeping cell and then determines that it corresponds to the low traffic cell in a next period, the EMS may deem the base station as the sleeping cell to generate an alarm message, and transmit the generated message to the network management system or the administrator server.

When the EMS determines that the existing base station corresponds to the Non-sleeping cell and then determines that it corresponds to the low traffic cell in a next period, the element management system may consider that the corresponding base station corresponds to the Non-sleeping cell. Here, considering that the corresponding base station corresponds to the sleeping cell or Non-sleeping cell may refer, for example, to the corresponding base station not separately performing an operation to determine whether the corresponding base station corresponds to the sleeping cell (e.g., in FIG. 12) and the corresponding base station is the sleeping cell or the Non-sleeping cell.

Figure 13:
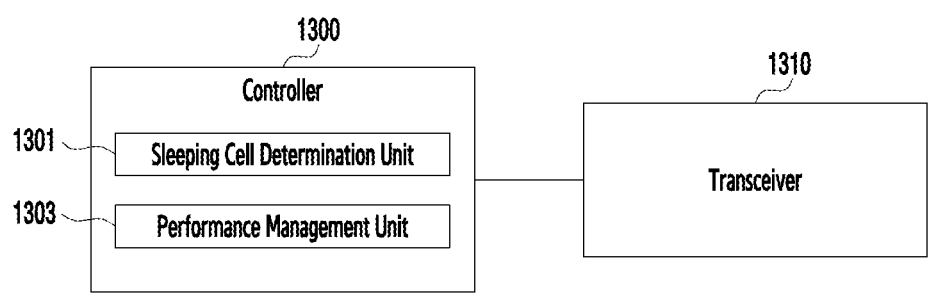
FIG. 13 is a block diagram illustrating an example configuration of the EMS according to various embodiments.

FIG. 13 is a block diagram illustrating an example configuration of an EMS according to various embodiments.

Referring to FIG. 13, the EMS includes a controller (e.g., including processing/control circuitry) 1300 and a transceiver 1310. The transceiver 1310 may transmit or receive data to/from other device (e.g., base station, NMS, or administrator server).

The controller 1300 may perform various operations of the EMS according to embodiments of the present disclosure by controlling status and operations of all components included in the EMS.

For example, the controller 1300 may control to receive radio resource control statistics information from a plurality of base stations, determine sleeping cell statistics information based on the received radio resource control statistics information, determine the sleeping cell based on the rate of RRC connection establishment success and the number of times of RRC connection establishment attempt, included in the sleeping cell statistics information, amongst the base stations except the low traffic cell of a plurality of base stations, and transmit an alarm signal for the sleeping cell to the administrator server or the NMS.

Further, in the present disclosure, the controller 1300 may determine the sleeping cell further based on the rate of EN-DC X2 message exchange procedure success, the rate of Xn message exchange procedure success, the number of times of EN-DC X2 message exchange procedure attempt, and the number of times of Xn message exchange procedure attempt.

Although FIG. 13 illustrates that the controller 1300 includes a sleeping cell determination unit (e.g., including various processing/control circuitry and/or executable program instructions) 1301 and a performance management unit (e.g., including various processing/control circuitry and/or executable program instructions) 1303, the present disclosure is not limited thereto. In other words, the sleeping cell determination unit 1301 and the performance management unit 1303 may be not included in the controller 1300 but included in the EMS as physically independent single component. The sleeping cell determination unit 1301 may perform a low traffic cell determination and a sleeping cell detection, and when the sleeping cell is detected, it may control to transmit the same to an administrator server or the like via the transceiver 1310. The performance management unit 1303 may manage radio resource control statistics information received from the base station.

Figure 14:
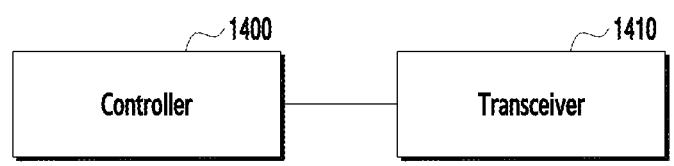
FIG. 14 is a block diagram illustrating an example configuration of a base station according to various embodiments.

FIG. 14 is a block diagram illustrating an example configuration of a base station according to various embodiments.

Referring to FIG. 14, the base station may include a controller (e.g., including processing/control circuitry) 1400 and a transceiver 1410. The transceiver 1410 may transmit or receive data to/from other device (e.g., base station, terminal, or EMS).

The controller 1400 may be configured to control the transceiver 1410 to transmit/receive an RRC message to/from the terminal, and control to periodically generate RRC-related statistics information and transmit the same to the EMS.

Further, the controller 1400 may be configured to control the transceiver 1410 to transmit and receive an X2 message through an X2 interface or an Xn message through an Xn interface with other base station, and control to periodically generate X2 or XN related statistics information to transmit the same to EMS.

According to the present disclosure, an administrator can use the performance statistics information received from the base station to continuously and periodically detect an abnormal operation related to base station access and thus, perform efficient base station management.

The methods described the present disclosure may be implemented by combining some or all of the contents included in each embodiment within a scope that does not depart from the essence of the disclosure.

The embodiments of the present disclosure and drawings are merely presented as particular examples to more easily explain the technical content disclosed and help a reader to understand better, and are not intended to limit the scope of the present disclosure. It will be apparent to those of ordinary skill in the art to which the present disclosure pertains that other modifications based on the technical spirit of the present disclosure can be implemented in addition to the embodiments disclosed herein.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by an element management system (EMS) in a communication system, the method comprising:
    receiving, from each of a plurality of base stations, performance information including first information on a number of times of radio resource control (RRC) connection establishment attempts and on a number of times of RRC connection establishment success;
    identifying second information, based on the performance information, wherein the second information comprises at least one of a downlink data transmission size or a base station availability ratio of each of the plurality of base stations;
    identifying at least one first base station from among the plurality of base stations, based on the second information, wherein each of the at least one first base station provides a cell in which an amount of data transmission is equal to or less than a reference traffic;
    identifying, based on the first information, at least one second base station from among remaining base stations other than the at least one first base station among the plurality of base stations, wherein each of the at least one second base station provides a cell in an abnormal state; and
    based on identifying the at least one second base station from among the remaining base stations, transmitting an alarm message for the at least one second base station.

2. The method according to claim 1, wherein the first information further comprises an hourly average rate of RRC connection establishment success, and an hourly average number of times of RRC connection establishment attempts, of a base station of the remaining base stations.

3. The method according to claim 2, wherein the identifying the at least one second base station further comprises:

identifying whether the hourly average number of times of RRC connection establishment attempts is equal to or less than a first threshold; and based on identifying the hourly average number of times of RRC connection establishment attempts is equal to or less than the first threshold, identifying a base station of the remaining base stations as one of the at least one second base station.

4. The method according to claim 3, wherein the identifying the at least one second base station further comprises:
based on identifying the hourly average number of times of RRC connection establishment attempts is more than the first threshold, identifying whether the hourly average number of times of RRC connection establishment attempts is equal to or more than a second threshold and the hourly average rate of RRC connection establishment success is less than or equal to a third threshold; and based on identifying the hourly average number of times of RRC connection establishment attempts is equal to or more than the second threshold and the hourly average rate of RRC connection establishment success is less than or equal to the third threshold, identifying a base station of the remaining base stations as one of the at least one second base station.

5. The method according to claim 1, further comprising, based on a message including information on an uplink signaling reception error being received from a base station of the plurality of base stations, transmitting the alarm message and the information.

6. The method according to claim 1,
wherein the first information further comprises at least one of: a number of times of evolved terrestrial radio access new radio-dual connectivity (EN-DC) X2 message exchange procedure attempt, a number of times of Xn message exchange procedure attempt, a number of times of EN-DC X2 message exchange procedure, a number of times of Xn message exchange procedure success, of each of the plurality of base stations, an hourly average rate of EN-DC X2 message exchange procedure success, or an hourly average rate of Xn message exchange procedure success; and
wherein the second information further comprises at least one of a daily average number of times of EN-DC X2 message exchange procedure success, a daily average number of times of Xn message exchange procedure success, or an hourly average number of times of EN-DC X2 message exchange procedure success.

7. The method according to claim 1, wherein the alarm message is transmitted to at least one of an administrator server or a network management system (NMS).

8. A server in a communication system, comprising:
a transceiver; and
a controller comprising processing circuitry, the controller being configured to control the transceiver to:
receive, from each of a plurality of base stations, performance information including first information on a number of times of radio resource control (RRC) connection establishment attempts and on a number of times of RRC connection establishment success;
identify second information, based on the performance information, wherein the second information comprises at least one of a downlink data transmission size or a base station availability ratio of each of the plurality of base stations;
identify at least one first base station from among the plurality of base stations, based on the second information, wherein each of the at least one first base station provides a cell in which an amount of data transmission is equal to or less than a reference traffic;
identify,—based on the first information, at least one second base station from among remaining base stations other than the at least one first base station among the plurality of base stations, wherein each of the at least one second base station provides a cell in an abnormal state; and
based on identifying the at least one second base station from among the remaining base stations, transmit an alarm message for the at least one second base station.

9. The server according to claim 8, wherein the first information further comprises an hourly average rate of RRC connection establishment success, and an hourly average number of times of RRC connection establishment attempts, of a base station of the remaining base stations.

10. The server according to claim 9, wherein the controller is further configured to:
identify whether the hourly average number of times of RRC connection establishment attempts is equal to or less than a first threshold; and
based on identifying the hourly average number of times of RRC connection establishment attempts is equal to or less than the first threshold, identify a base station of the remaining base stations as one of the at least one second base station.

11. The server according to claim 9, wherein the controller is further configured to:
based on identifying the hourly average number of times of RRC connection establishment attempts is more than the first threshold, identify whether the hourly average number of times of RRC connection establishment attempts is equal to or more than a second threshold and the hourly average rate of RRC connection establishment success is less than or equal to a third threshold; and
based on identifying the hourly average number of times of RRC connection establishment attempts is equal to or more than the second threshold and the hourly average rate of RRC connection establishment success is less than or equal to the third threshold, identify a base station of the remaining base stations as one of the at least one second base station.

12. The server according to claim 8,
wherein the controller is further configured to control the transceiver to, based on a message including information on an uplink signaling reception error being received from a base station of the plurality of base stations, transmit the alarm message and the information; and
wherein the alarm message is transmitted to at least one of an administrator server or a network management system (NMS).

13. The server according to claim 8,
wherein the first information further comprises at least one of a number of times of evolved terrestrial radio access new radio-dual connectivity (EN-DC) X2 message exchange procedure attempt, a number of times of Xn message exchange procedure attempt, a number of times of EN-DC X2 message exchange procedure, a number of times of Xn message exchange procedure success, of each of the plurality of base stations, an hourly average rate of EN-DC X2 message exchange procedure success, or an hourly average rate of Xn message exchange procedure success; and wherein the second information further comprises at least one of a daily average number of times of EN-DC X2 message exchange procedure success, a daily average number of times of Xn message exchange procedure success, or an hourly average number of times of EN-DC X2 message exchange procedure success.

\* \* \* \* \*